(12) United States Patent  
Su et al.

(10) Patent No.: US 6,457,035 B1  
(45) Date of Patent: Sep. 24, 2002

(54) TABLE MATCHING FOR MULTIPLICATION OF ELEMENTS IN GALOIS FIELD

(75) Inventors: Wei-Ming Su; Banyan Shin Yung Chen, both of Taipei; Yi-Lin Lai, Kee-Lung, all of (TW)

(73) Assignee: Via Technologies, Inc., Taipei (TW)

( * ) Notice: Subject to any disclaimer, the term of this patent is extended or adjusted under 35 U.S.C. 154(b) by 0 days.

(21) Appl. No.: 09/435,487

(22) Filed: Nov. 8, 1999

(30) Foreign Application Priority Data

Apr. 28, 1999 (TW) ...................................... 88106873 A

(51) Int. Cl.[7] ................................................ G06F 7/00
(52) U.S. Cl. ........................................................ 708/492
(58) Field of Search ................................. 708/491–492

(56) References Cited

U.S. PATENT DOCUMENTS

| | | | | |
|---|---|---|---|---|
| 4,994,995 A | * | 2/1991 | Anderson et al. | 708/492 |
| 5,499,299 A | * | 3/1996 | Takenaka et al. | 708/491 |
| 5,694,407 A | * | 12/1997 | Glaise | 714/807 |
| 5,793,659 A | * | 8/1998 | Chen et al. | 708/491 |
| 6,026,420 A | * | 2/2000 | DesJardins et al. | 708/492 |
| 6,029,186 A | * | 2/2000 | DesJardins et al. | 708/492 |
| 6,128,760 A | * | 10/2000 | Poeppleman et al. | 708/492 |
| 6,219,815 B1 | * | 4/2001 | DesJardins et al. | 708/492 |

* cited by examiner

*Primary Examiner*—Tan V. Mai  
(74) *Attorney, Agent, or Firm*—Rabin & Berdo, P.C.

(57) ABSTRACT

A table matching method for multiplication of elements in Galois Field. First, a table of the byte value in Galois Field and the corresponding exponent is formed in the hardware. To perform the multiplication between two elements in the Galois Field, the corresponding exponents of the two elements are found out in advance. The two exponents are then added up to obtain a sum. Then, by using the table, a corresponding byte value of the sum can be obtained. The byte value is the product of the two elements in the Galois Field.

28 Claims, 1 Drawing Sheet

TABLE MATCHING FOR MULTIPLICATION OF ELEMENTS IN GALOIS FIELD

BACKGROUND OF THE INVENTION

This application incorporates by reference Taiwanese application Ser. No. 88106873, Filed Apr. 4, 1999.

1. Field of the Invention

The invention relates in general to a table matching method for multiplication of elements in Galois Field, and more particularly to a method which can effectively obtain the product of elements in Galois Field by using a table formed in the computer hardware.

2. Description of the Related Art

Conventionally, binary scales are utilized to store and read data in a computer. An 8-bit byte is taken as an example. The byte "00000000" represents the value 0, the byte "00000001" represents the value 1, and similarly, the byte "11111111" represents the value 255. Herein, the symbol F{2^8} is used to represent the 8-bit binary field. In the field F{2^8}, every element represents a byte which corresponds to a value in [0,255] respectively. Moreover, the 8-bit Galois Field is denoted by GF{2^8}. Every byte in the field GF{2^8} can be represented by a value in $\{0, \alpha, \alpha^2, \ldots, \alpha^{255}\}$, respectively, wherein α is "00000010".

There are many well known methods or apparatuses taking use of the characteristics of the Galois Field. For example, U.S. Pat. No. 5,694,407 deals with the calculation of error-detecting code in the intermediate network; and U.S. Pat. No. 4,994,995 discloses a method and apparatus for computing the result of the division of two finite elements in a Galois Field.

The multiplication operation, denoted by "*" of any byte A ($b_7, b_6, b_5, b_4, b_3, b_2, b_1, b_0$) in GF{2^8} and α conventionally follows two steps. First, every bit $b_i$ (i=0~7) of the byte A should be first left-shifted for one bit. Then, according to the Equation (1), the product of A* α can be obtained.

$$A*\alpha = (b_6, b_5, b_4, b_3, b_2, b_1, b_0, 0) \oplus (0,0,0,b_7,b_7,b_7,0,b_7) \quad (1)$$

While any byte A ($b_7, b_6, b_5, b_4, b_3, b_2, b_1, b_0$) in GF{2^8} is to be multiplied by α, the multiplication, denoted by "*" is performed as follows: every bit $b_i$ (i=0~7) in the byte A should be first left-shifted for one bit, and then according to the Equation (1), the value of A* α can be obtained.

The operator "⊕" in the Equation (1) is an Exclusive OR (XOR) logic operator. The result of the above-mentioned multiplication can be obtained, basing on the equation $\alpha^8 = \alpha^4 \oplus \alpha^3 \oplus \alpha^2 \oplus \alpha^0$. Consequently, it is to be understood that $\alpha^2$ is "00000100", ..., $\alpha^7$ is "10000000", and $\alpha^8$ is "00001101".

When the most significant bit (MSB), $b_7$, of the byte A is "1", according to the Equation (1), the value of A* α is the result of ($b_6, b_5, b_4, b_3, b_2, b_1, b_0, 0$) ⊕ (0,0,0,0,1,1,0,1). Thus, $\alpha^9$ is "00111010", ..., $\alpha^{12}$ is "11001101", $\alpha^{13}$ is "10000111", ..., and accordingly, $\alpha^{255}$ is "00000001". The operation including the steps of left shifting every bit for one bit and utilizing the XOR logic operation is called "shift operation."

It is demonstrated that each of the 255 values, $\alpha, \alpha^2, \ldots, \alpha^{255}$, corresponds to each byte in [1,255], respectively. The one-to-one relationship between the byte value A and the corresponding exponential number n (A=α^n) is shown in Table 1.

TABLE 1

| Byte value A | Exponential number k |
|---|---|
| 1 | 255 |
| 2 | 1 |
| 3 | 25 |
| . | . |
| . | . |
| . | . |
| 254 | 88 |
| 255 | 175 |

Conventionally, the multiplication product of the two elements A, B in GF{2^8} is obtained by first expressing the multiplier B(B≠0) in the form of α^k (k=1~255). Time for finding the value k is assumed to be T. To obtain the product of A*B, the multiplicand A should be multiplied by α for k times and each time the shift operation mentioned above has to be performed once. Therefore, to multiply A by α for n times needs the shift operation to be applied for n times. This shift operation takes about one period T. While the value of k is large, such as 250, the shift operation has to be performed for 250 times, which takes at long as 250*T. Therefore, the time-consuming is highly increased.

SUMMARY OF THE INVENTION

It is therefore an object of the invention to provide a table matching method for the multiplication of elements in Galois Field. By utilizing a matching table of the byte values and the corresponding exponential numbers, the corresponding exponential numbers of the multiplicand and the multiplier are looked up respectively. Next, these two exponents are added up. Then, the corresponding byte value of the sum is look up from the table to quickly obtain the result of the multiplication.

In order to accomplish the object of the invention, a table matching method for the multiplication of elements in Galois Field is provided. The process includes at least the following steps. At first, a table between the byte value in [1,255] and the corresponding exponent in formed. These byte values 1~255 are set to be the addresses 1~255 in the computer hardware. Moreover, the corresponding exponents are stored in the hardware according to the addresses 1~255. Likewise, in the same table, the exponents 256~510 of the byte α are set to be the addresses 256~510, and their corresponding byte values $\alpha = \alpha^{256}, \alpha^2 = \alpha^{257}, \ldots \alpha^{255} = \alpha^{510}$ are stored in the addresses 256~510. When the multiplication operation between two elements in the Galois Field is operated, the corresponding exponents of the two elements are found out respectively. After the two exponents are added up, the corresponding byte value of the sum is obtained from the table. Therefore, the result of the multiplication can be obtained very quickly.

BRIEF DESCRIPTION OF THE DRAWINGS

Other objects, features, and advantages of the invention will become apparent from the following detailed description of the preferred but non-limiting embodiments. The description is made with reference to the accompanying drawings in which.

DESCRIPTION OF THE PREFERRED EMBODIMENT

Figure 1:
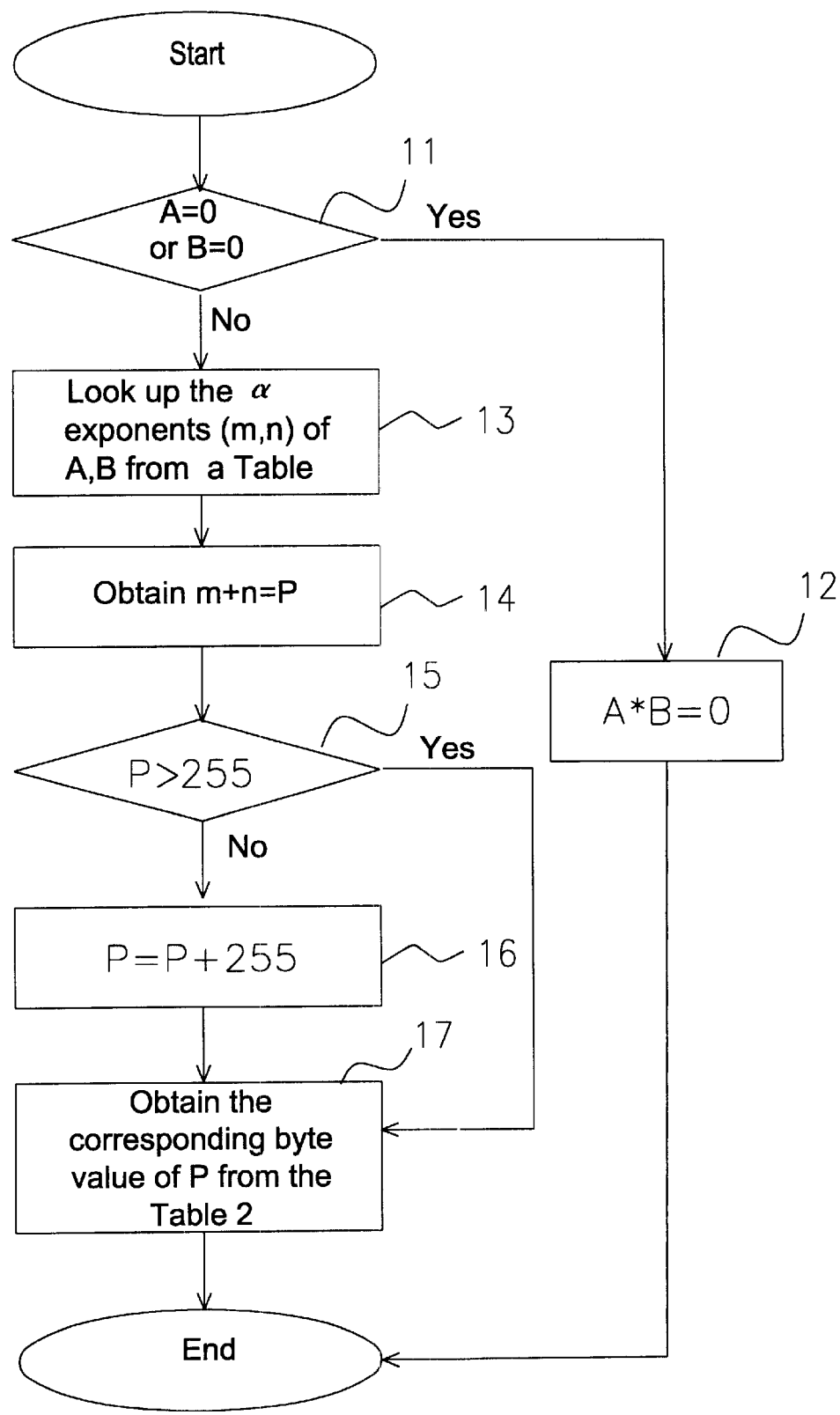
FIG. 1 is a block diagram showing a table matching method for multiplication of elements in Galois Field according to a preferred embodiment of the invention.

As described above, every element in GF{2^8} can be represented in the form of a α^k. According to a preferred embodiment of the invention, the characteristic is utilized to form a quick table matching method for the multiplication of elements in GF{2^8}.

TABLE 2

| Address # a | Exponential number m | Address # p | Byte value c |
|---|---|---|---|
| 1 | 255 | 256 | 2 |
| 2 | 1 | 257 | 4 |
| 3 | 25 | 258 | 8 |
| . | . | . | . |
| . | . | . | . |
| . | . | . | . |
| 254 | 88 | 509 | 134 |
| 255 | 175 | 510 | 1 |

According to Table 2, the value a (a∈[1,255]) of every byte A in GF{2^8} is set to be the address #a in the hardware. Because any value multiplied by 0 always gets the result of 0, the byte value 0 is not considered here. Next, the corresponding exponent m (m∈[1,255]) of the byte A is stored in the address #a denoting the byte value a. For example, the byte value of the byte "00000011"(=α^25) is 3. Thus the address denoting "00000011" is #3, and the data stored in the address #3 is the exponent 25. Likewise, the address denoting "11111111" is #255, and the data in the address #255 is the exponent 175. In this way, the addresses and the corresponding exponents of the residual bytes can be obtained.

According to the exponent multiplication principle, $A*B = \alpha^m * \alpha^n = \alpha^{(m+n)} = \alpha^p$. The multiplication operation of the two elements results in the sum of two exponents. However, the sum of any two exponents m,n may not be in the range of (1, 255) so that the corresponding byte value c(c=α^b) is further stored in the address #p(p=256~510). For example, the data stored in the address #256 is the byte value 2(=α^{256}), and the data in the address #510 is the byte value 1 (=α^{510}). Accordingly, Table 2 of the byte value a (denoted by the address #a) and the corresponding exponent m is formed.

Referring to FIG. 1, according to a preferred embodiment of the invention, a multiplication (*) operation of two elements A and B in GF{2^8} includes the following steps. First of all, it should be determined whether the element A or B is 0 (00000000), as shown in the step 11. If the element, either A or B, is equal to zero, the product A*B should be zero, as shown in the step 12. If neither of the element A nor the element B is equal to zero, the step 13 should be processed. In the step 13, from the Table 2 listed above, the corresponding exponents m and n (1≦m, n≦255) of the two elements A and B, where A=α^m, and B=α^n, are obtained. Next, the two exponents m and n are added to obtain a sum p (2≦p≦510), as shown in the step 14. Therefore, $A*B = \alpha^m * \alpha^n = \alpha^{(m+n)} = \alpha^p$. Then, in the step 15, it is determined whether p is larger than 255 or not. If the value of p is larger than 255, the step 17 is then followed to process. In the step 17, the product of A*B can be obtained by looking up the corresponding byte value of the value p from the Table 2. If the value of p is not larger than 255, the step 16 is then performed. In the step 16, 255 is added to p (p=p+255), according to the periodic relationship α^n=α^(n+255). After that, the step 17 as mentioned above, is continued.

According to a preferred embodiment of the invention, first, to obtain the corresponding exponents of two elements in Galois Field from the matching table takes about two periods 2*T. Next, to obtain the sum of these two exponents further takes about one period T. Moreover, to obtain the corresponding byte value of the sum from the table takes about one period T. Therefore, the process of obtaining the product of the two elements takes only about four periods 4*T in total. Compared with the conventional multiplication operation, the method according to the invention takes much less time.

While the invention has been described by way of example and in terms of a preferred embodiment, it is to be understood that the invention is not limited thereto. To the contrary, it is intended to cover various modifications and similar arrangements and procedures, and the scope of the appended claims therefore should be accorded the broadest interpretation so as to encompass all such modifications and similar arrangements and procedures.

What is claimed is:

1. A table matching method for multiplication of elements in Galois Field, which is for obtaining a product of a first value and a second value in Galois Field, comprising the steps of:

forming a first table in a hardware for listing a plurality of third values in the Galois Field, and a plurality of first exponents corresponding to the third values;

forming a second table in the hardware for listing a plurality of second exponents, and a plurality of fourth values corresponding to the second exponents;

utilizing the first table to obtain a third exponent and a fourth exponent corresponding to the first value and the second value, respectively;

adding the third exponent and the fourth exponent to obtain a sum; and utilizing the second table to obtain said product corresponding to the sum.

2. A method according to claim 1, wherein the first value and the second value are byte values.

3. A method according to claim 1, wherein neither the first value nor the second value is zero.

4. A method according to claim 1, wherein the product of the first value and the second value is zero when the first value is zero.

5. A method according to claim 1, wherein the product of the first value and the second value is zero when the second value is zero.

6. A method according to claim 1, wherein the first exponent, the second exponent, the third exponent and the fourth exponent are exponents of byte "00000010".

7. A method according to claim 1, wherein the third values are represented by a plurality of first addresses in the hardware.

8. A method according to claim 7, wherein the first addresses are 1~255.

9. A method according to claim 7, wherein the first exponents are stored in the first addresses.

10. A method according to claim 1, wherein the second exponents are represented by a plurality of second addresses in the hardware.

11. A method according to claim 10, wherein the second addresses are 256~510.

12. A method according to claim 10, wherein the fourth values are stored in the second addresses.

13. A method according to claim 1, wherein the sum is larger than 255.

14. A method according to claim 1, wherein said product is the sum plus 255 if the sum is not larger than 255.

15. A table matching method for multiplication of elements in Galois Field, which is for obtaining a product of a first value and a second value in Galois Field by a mathematics feature of Galois Field, in decoding a video-audio processor, comprising the steps of:

forming a table for listing a plurality of third values in Galois Field and a plurality of first exponents corresponding to the third values, and a plurality of second exponents and a plurality of fourth values corresponding to the second exponents;

utilizing the table to obtain a third exponent and a fourth exponent corresponding to the first value and the second value, respectively;

obtaining a sum of the third exponent and the fourth exponent; and utilizing the table to obtain said product corresponding to the sum.

16. A method according to claim 15, wherein the values of the first value, the second value, the third value, and the fourth value are all byte values.

17. A method according to claim 15, wherein neither of the first and the second values are zero.

18. A method according to claim 15, wherein the first value is zero and the multiplication of the first value and the second value is zero.

19. A method according to claim 15, wherein the second value is zero and the multiplication of the first value and the second value is zero.

20. A method according to claim 15, wherein the first, second, and third exponents are all exponential exponents of the byte "00000010".

21. A method according to claim 15, wherein the third values are represented by a plurality of first addresses in the hardware.

22. A method according to claim 21, wherein the first addresses are 1~255.

23. A method according to claim 21, wherein the corresponding first exponents are stored in the first addresses.

24. A method according to claim 15, wherein the second exponents are represented by a plurality of second addresses in the hardware.

25. A method according to claim 24, wherein the second addresses are 256~510.

26. A method according to claim 24, wherein the corresponding fourth values are stored in the second addresses.

27. A method according to claim 15, wherein the sum is larger than 255.

28. A method according to claim 15, wherein said product is the sum plus 255 if the sum is not larger than 255.

\* \* \* \* \*